United States Patent
Schmidt et al.

[15] 3,697,518
[45] Oct. 10, 1972

[54] PHOSPHORUS ACID ESTERS OF 3-HYDROXY-BENZO-1,2,4-TRIAZINE -1-N-OXIDE

[72] Inventors: Karl-Julius Schmidt, Wuppertal-Vohwinkel; Ingeborg Hammann, Cologne, both of Germany

[73] Assignee: Farbenfabriken Bayer Aktiengesellschaft, Leverkusen, Germany

[22] Filed: Nov. 10, 1969

[21] Appl. No.: 875,553

[30] Foreign Application Priority Data

Nov. 16, 1968 Germany..........P 18 09 390.8

[52] U.S. Cl. ............................260/248 AS, 424/249
[51] Int. Cl. ............................................C07d 55/10
[58] Field of Search................................260/248 AS

[56] References Cited

UNITED STATES PATENTS 3,349,088    10/1967    Molnar et al. ..............260/248

*Primary Examiner*—John M. Ford
*Attorney*—Burgess, Dinklage & Sprung

[57] ABSTRACT

Phosphorus acid esters of 3-hydroxy-benzo-1,2,4-triazine-1-N-oxide, i.e. phosphoric, phosphonic, thionophosphoric and thionophosphonic acid esters of 3-hydroxy-benzo-1,2,4-triazine-1-N-oxide, or 3-[(alkyl, phenyl and O-alkyl)-O-alkyl-phosphoryloxy, phosphonyloxy, thiono-phosphoryloxy and thionophosphonyloxy]-benzo-1,2,4-triazine-1-N-oxide, which possess arthropodicidal especially acaricidal and insecticidal, properties, and which may be produced by conventional methods.

10 Claims, No Drawings

PHOSPHORUS ACID ESTERS OF 3-HYDROXY-BENZO-1,2,4-TRIAZINE-1-N-OXIDE

The present invention relates to and has for its objects the provision for particular new phosphorus acid esters of 3-hydroxy-benzo-1,2,4-triazine-1-N-oxide, i.e., phosphoric, phosphonic, thionophosphoric and thionophosphonic acid esters of 3-hydroxy-benzo-1,2,4-triazine-1-N-oxide, or 3-[(alkyl, phenyl and O-alkyl)-O-alkyl-phosphoryloxy, phosphonyloxy, thionophosphoryloxy and thionophosphonyloxy]-benzo-1,2,4-triazine-1-N-oxide, which possess arthropodicidal, especially insecticidal and acaricidal, properties, active compositions in the form of mixtures of such compounds with solid and liquid dispersible carrier vehicles, and methods for producing such compounds and for using such compounds in a new way, especially for combating pests, e.g., arthropods, with other and further objects becoming apparent from a study of the within specification and accompanying examples.

In Belgian Pat. No. 702,672, there are described phosphoric and phosphonic acid esters (including the corresponding thio compounds) of 2-hydroxy-quinoxalines which possess a good activity against sucking or biting insects and which can therefore be used as pesticides. Among such known compounds are:

O,O-dimethyl-O-(7-methyl-quinoxalin-2-yl)-thionophosphoric acid ester, i.e., O,O-dimethyl-O-(7-methyl-benzo-1,4-diazin-2-yl)-thiono-phosphoric acid ester (A), O,O-diethyl-O-(7-chloro-quinoxalin-2-yl)-thionophosphoric acid ester, i.e., O,O-diethyl-O-(7-chloro-benzo-1,4-diazin-2-yl)-thiono-phosphoric acid ester (B), ethyl-O-ethyl-O-(methyl-quinoxalin-2-yl)-thionophosphonic acid ester, i.e., ethyl-O-ethyl-O-(methyl-benzo-1,4-diazin-2-yl)-thiono phosphonic acid ester (C), phenyl-O-ethyl-O-(dimethyl-quinoxalin-2-yl)-thionophosphonic acid ester, i.e., phenyl-O-ethyl-O-(dimethylbenzo-1,4-diazin-2-yl)-thiono-phosphonic acid ester (D), O,O-diethyl-O-(dimethyl-quinoxalin-2-yl)-thionophosphoric acid ester, i.e., O,O-diethyl-O-(dimethyl-benzo-1,4-diazin-2-yl)-thiono-phosphoric acid ester (E), and ethyl-O-ethyl-O-(dimethyl-quinoxalin-2-yl)-thionophosphonic acid ester, i.e., ethyl-O-ethyl-O-(dimethyl-benzo-1,4-diazin-2-yl)-thiono-phosphonic acid ester (F).

It has now been found, in accordance with the present invention, that the particular new phosphorus acid esters of 3-hydroxy-benzo-1,2,4-triazine-1-N-oxide of the formula

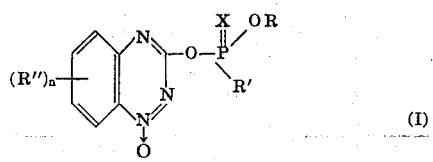

in which
R is alkyl of one to four carbon atoms,
R' is alkyl of one to four carbon atoms, alkoxy of one to four carbon atoms or phenyl,
R'' is alkyl of one to four carbon atoms or alkoxy of one to four carbon atoms,
X is oxygen or sulfur, and
n is a whole number from 0 to 2,
exhibit strong arthropodicidal, especially insecticidal and acaricidal, properties.

It has been furthermore found, in accordance with the present invention, that the particular new compounds of formula (I) above may be produced by the process which comprises reacting a 3-hydroxy-benzotriazine-1-N-oxide of the formula

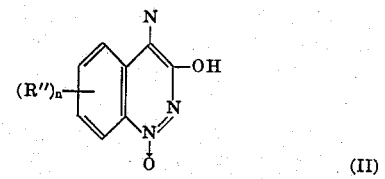

in which
R'' and n are the same as defined above, with a phosphorus compound of the formula

in which
R, R' and X are the same as defined above, and
Hal is a halogen atom such as chloro, bromo, iodo or fluoro, especially chloro or bromo.

Advantageously, the particular new compounds of formula (I) above are distinguished by outstanding insecticidal and acaricidal properties with a remarkably reduced mammalian toxicity, especially excellent activity against biting and sucking insects, as well as, in most cases, extremely low toxicity to warm-blooded animals and concomitantly low phytotoxicity. It is decidedly surprising that the compounds according to the present invention are superior to the above-mentioned comparable known compounds of analogous constitution and the same type of activity. The compounds of the present invention therefore represent a valuable enrichment of the art.

The production process according to the present invention is illustrated by the following reaction scheme:

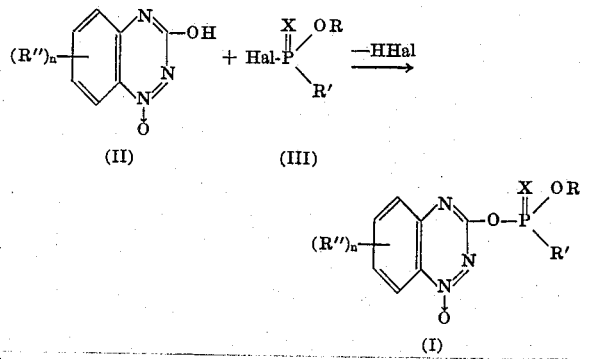

The starting materials which may be used for producing the instant new compounds are clearly characterized by formulas (II) and (III) above.

Advantageously, in accordance with the present invention, in the various formulas herein:

R represents
straight and branched chain lower alkyl hydrocarbon of one to four carbon atoms such as methyl, ethyl, n- and iso-propyl, n-, iso-, sec.- and tert.-butyl, and the like, and especially $C_{1-3}$ or $C_{1-2}$ alkyl;

R' represents
straight and branched chain lower alkyl hydrocarbon of one to four carbon atoms such as methyl to tert.-butyl inclusive as defined above, and the like, and especially $C_{1-3}$ or $C_{1-2}$ alkyl;
straight and branched chain lower alkoxy of one to four carbon atoms such as methoxy, ethoxy, n- and iso-propoxy, n-, iso-, sec.- and tert.-butoxy, and the like, and especially $C_{1-3}$ or $C_{1-2}$ alkoxy; or
phenyl;

R' represents
straight and branched chain lower alkyl hydrocarbon of 1-4 carbon atoms such as methyl to tert.-butyl inclusive as defined above, and the like, and especially $C_{1-3}$ or $C_{1-2}$ alkyl; or
straight and branched chain lower alkoxy of one to four carbon atoms such as methoxy to tert-butoxy inclusive as defined above, and the like, and especially $C_{1-3}$ or $C_{1-2}$ alkoxy;

X represents
oxygen; or
sulfur; and n represents
a whole number from 0 to 2, and especially 0-1.

Preferably, R is $C_{1-3}$ or $C_{1-2}$ alkyl; R' is $C_{1-3}$ or $C_{1-2}$ alkyl; or $C_{1-3}$ or $C_{1-2}$ alkoxy; or phenyl; R" is $C_{1-2}$ alkyl; or $C_{1-2}$ alkoxy; X is oxygen; or sulfur; and n is 0–2.

More particularly, R is $C_{1-3}$ or $C_{1-2}$ alkyl; R' is $C_{1-3}$ or $C_{1-2}$ alkyl; or $C_{1-3}$ or $C_{1-2}$ alkoxy; or phenyl; R" is methyl; or methoxy; X is oxygen; or sulfur; and n is 0–2.

Some of the 3-hydroxy-benzotriazine-1-N-oxides (which may be substituted) required as starting materials for the instant production process are known from the literature. Such starting materials can be readily prepared, even on an industrial scale, by cyclization of the appropriate o-nitro-phenyl ureas with aqueous alkali according to the following equation:

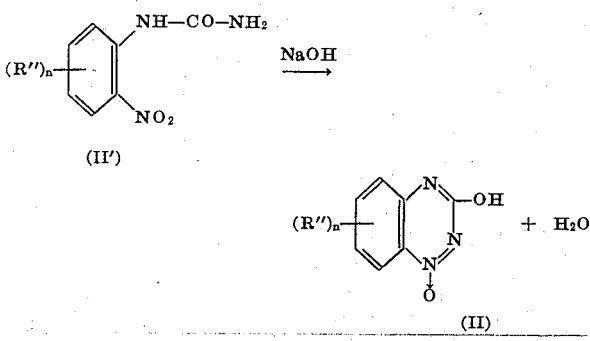

In the above equation, the symbols R" and n are the same as defined above.

The production process according to the present invention is preferably carried out with the use of a suitable solvent (which term includes a mere diluent). As such, practically all inert organic solvents or mixtures thereof are suitable, such as hydrocarbons, for example benzine, benzene, toluene, chlorobenzene, and xylene; ethers, for example diethyl and dibutyl ether, and dioxan; ketones, for example acetone, methyl-ethyl ketone, methylisopropyl ketone and methylisobutyl ketone; low-boiling aliphatic alcohols, for example methanol and ethanol; nitriles, for example acetonitrile and propionitrile; and dimethyl formamide; and the like.

Moreover, the reaction according to the instant production process is preferably carried out in the presence of an acid acceptor. For this purpose, practically all customary acid-binding agents can be used. Particularly suitable have proved to be alkali metal alcoholates and carbonates, such as potassium and sodium methylate or ethylate and sodium and potassium carbonate. However, tertiary aromatic or heterocyclic amines, for example triethylamine, dimethylaniline and pyridine; and the like, are also useful.

The reaction temperature can be varied within a fairly wide range. In general, the reaction is carried out at substantially between about 20°–120° C (or the boiling point of the mixture, whichever is the lower), and preferably at between about 40°–80° C (or the boiling point of the mixture, whichever is the lower).

The starting materials which may be reacted according to the instant production process as well as the acid-binding agents which may be employed, are, in general, used in stoichiometric amounts. After combining the starting components, it is advantageous to continue heating the mixture for a period (generally for about ½ to 3 hours), optionally with stirring, in order to complete the reaction. With this method of working, the instant active compounds are obtained readily and comparatively inexpensively in outstanding yields as well as in excellent purity.

The instant active compounds according to formula (I) above are obtained in most cases as colorless crystals with sharp melting points which, if necessary, can readily be further purified by recrystallization from the customary solvents. In some cases, the active compounds are obtained in the form of colorless to yellow-colored, viscous, water-insoluble oils which cannot be distilled without decomposition but which, by so-called "slight distillation," that is longer heating to moderately elevated temperatures under reduced pressure, can be freed from the last volatile components and in this way be purified. For their more precise characterization, the determination of refractive index for the instant compounds can be used.

Advantageously, as aforesaid, the instant new compounds are distinguished by outstanding insecticidal and acaricidal effectiveness, with only slight phytotoxicity. Moreover, some of the instant compounds possess herbicidal properties. For this reason, the active compounds according to the present invention can be used with success in crop protection and the protection of stored products, as well as in the hygiene field, for the control of noxious sucking and biting insects and Diptera as well as against mites (Acaroma). Furthermore, some of the instant compounds are suitable as weed control agents or bird repellents.

To the sucking insects contemplated herein there belong, in the main, aphids (Aphidae) such as the green peach aphid (Myzus persicae), the bean aphid (Doralis fabae), the bird cherry aphid (Rhopalosiphum padi.), the pea aphid (Macrosiphum pisi) and the potato aphid (Macrosiphum solanifolii), the currant gall aphid (Cryptomyzus korschelti), the mealy apple aphid (Sappaphis mali), the mealy plum aphid (Hyalopterus arundinis)

and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (*Lepidoptera*) such as the diamond-back moth (*Plutella maculipennis*), the gipsy moth (*Lymantria dispar*), the brown-tail moth () *chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimsatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia Kuhniella*) and greater wax moth (*Galleria mellonella*); and the like.

Also to be classed with the biting insects contemplated herein, are beetles (*Coleoptera*), for example the granary weevil (*Sitophilus granarius* = *Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*, the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), but also species living in the soil, for example wireworms (*Agriotes* spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, *Orthoptera*, for example the house cricket (*Gryllus domesticus*); termites such as the eastern subterranean termite (*Reticulitermes flavipes*) and *Hymenoptera* such as ants, for example the garden ant (*Lasius niger*); and the like.

The *Diptera* contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

In the case of the mites (*Acari*) contemplated herein there are classed, in particular, the spider mites (*Tetranychidae*) such as the two-spotted spider mite (*Tetranychus telarius* = *Tetranychus althaeae* or *Tetranychus urticae*) and the European red mite (*Paratetranychus pilosus* = *Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g., conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g., benzene, toluene, xylene, etc.), halogenated, especially chlorinated, aromatic hydrocarbons (e.g., chloro-benzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanol-amine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.) and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.00001–20 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.00001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g., about 20–100 percent by weight of the active compound.

Furthermore, the present invention contemplates methods of selectively killing, combating or controlling pests, e.g., arthropods, i.e., insects and acarids, and more particularly methods of combating at least one of insects and acarids which comprise applying to at least one of correspondingly (a) such insects, (b) such acarids, and (c) the corresponding habitat, i.e., the locus to be protected, a correspondingly combative or toxic amount, i.e., an arthropodicidally, especially insecticidally or acaricidally, effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test

Solvent: 3 parts by weight acetone

Emulsifier: 1 part by weight alkylaryl polyglycol ether

To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100 percent means that all the caterpillars are killed, whereas 0 percent means that none of the caterpillars are killed.

The particular active compounds tested, their concentrations, the evaluation time and the results can be seen from the following Table 1:

TABLE 1

Plutella test

| Active compound (constitution) | Concentration of active compound in percent | Degree of destruction in percent after 3 days |
|---|---|---|
| (A) 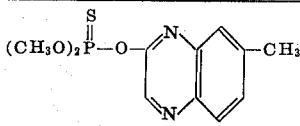 (known) | 0.01 | 30 |
| (B) 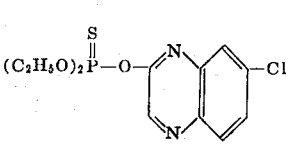 (known) | 0.01<br>0.001 | 100<br>0 |

TABLE 1—Continued
Plutella test
| Active compound (constitution) | Concentration of active compound in percent | Degree of destruction in percent after 3 days |
|---|---|---|
| ($1_1$) 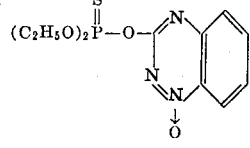 | 0.01<br>0.001 | 100<br>100 |
| ($2_1$) 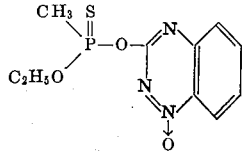 | 0.01<br>0.001 | 100<br>100 |
| ($3_1$) 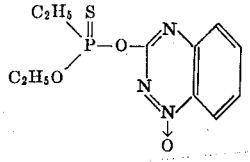 | 0.01<br>0.001 | 100<br>100 |
| ($4_1$) 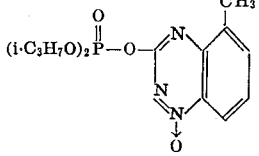 | 0.01<br>0.001 | 100<br>100 |
| ($5_1$) 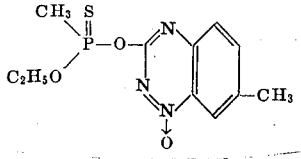 | 0.01<br>0.001 | 100<br>50 |
| ($24_1$) 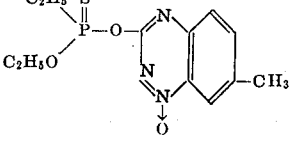 | 0.01<br>0.001 | 100<br>100 |
| ($6_1$) 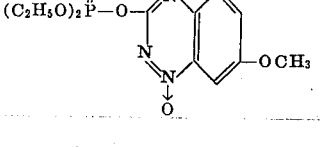 | 0.01<br>0.001 | 100<br>95 |
| ($7_1$) 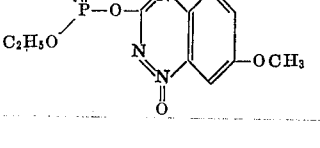 | 0.01<br>0.001 | 100<br>80 |
| ($8_1$) 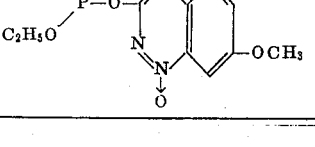 | 0.01<br>0.001 | 100<br>40 |

EXAMPLE 2

Phaedon larvae test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (Brassica oleracea) are sprayed with this preparation of the given active compound until dripping wet and then infested with mustard beetle larvae (Phaedon cochleariae).

After the stated period of time, the degree of destruction of the pests is determined and expressed as a percentage: 100 percent means that all, and 0 percent means that none, of the beetle larvae are killed.

The particular active compounds tested, their concentrations, the evaluation time and the results obtained can be seen from the following Table 2:

TABLE 2
Phaedon larvae test

| Active compound (constitution) | Concentration of active compound in percent | Degree of destruction in percent after 3 days |
|---|---|---|
| (C) [structure] (known) | 0.01 / 0.001 | 100 / 0 |
| (9₁) [structure] | 0.01 / 0.001 | 100 / 80 |
| (10₁) [structure] | 0.01 / 0.001 | 100 / 100 |
| (11₁) [structure] | 0.01 / 0.001 | 100 / 70 |

EXAMPLE 3

Myzus test (contact action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage plants (Brassica oleracea) which have been heavily infested with peach aphids (Myzus persicae) are sprayed with the preparation of the given active compound until dripping wet.

After the specified period of time, the degree of destruction is determined as a percentage: 100 percent means that all the aphids are killed, whereas 0 percent means that none of the aphids are killed.

The particular active compounds tested, their concentrations, the evaluation time and the results obtained can be seen from the following Table 3:

TABLE 3
Myzus test

| Active compound (constitution) | Concentration of active compound in percent | Degree of destruction in percent after 24 hours |
|---|---|---|
| (D) [structure] (known) | 0.1 | 40 |
| (12₁) [structure] | 0.1 / 0.01 / 0.001 | 100 / 100 / 60 |
| (13₁) [structure] | 0.1 / 0.01 | 100 / 100 |

TABLE 3—Continued
Myzus test

| Active compound (constitution) | | Concentration of active compound in percent | Degree of destruction in percent after 24 hours |
|---|---|---|---|
| (4₂) | 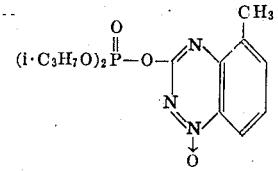 | 0.1<br>0.01<br>0.001 | 100<br>100<br>100 |
| (14₁) | 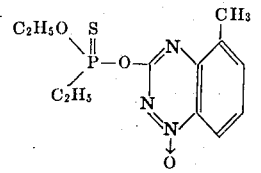 | 0.1<br>0.01<br>0.001 | 100<br>99<br>50 |
| (15₁) | 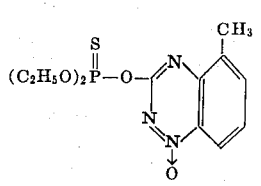 | 0.1<br>0.01 | 100<br>80 |
| (16₁) | 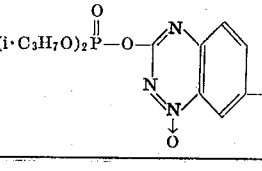 | 0.1<br>0.01 | 100<br>100 |

EXAMPLE 4

Tetranychus test
 Solvent: 3 parts by weight acetone
 Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100 percent means that all the spider mites are killed, whereas 0 percent means that none of the spider mites are killed.

The particular active compounds tested, their concentrations, the evaluation time and the results obtained can be seen from the following Table 4:

TABLE 4
Tetranychus test

| Active compound (constitution) | | Concentration of active compound in percent | Degree of destruction in percent after 2 days |
|---|---|---|---|
| (E) | 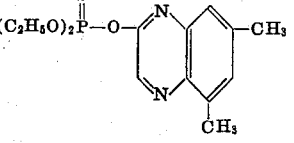 | 0.1 | 0 |
| | (known) | | |
| (C) | 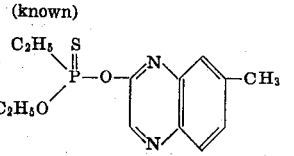 | 0.1 | 20 |

TABLE 4—Continued

Tetranychus test

| Active compound (constitution) | Concentration of active compound in percent | Degree of destruction in percent after 2 days |
|---|---|---|
| (F) (known) $C_2H_5$–P(=S)(–OC_2H_5)–O–[6,8-dimethyl-benzo-1,2,4-triazine] | 0.1 | 20 |
| (17₁) (known) $(C_2H_5O)_2$P(=O)–O–[benzo-1,2,4-triazine-1-N-oxide] | 0.1 | 100 |
| (2₂) $CH_3$–P(=S)(–OC_2H_5)–O–[benzo-1,2,4-triazine-1-N-oxide] | 0.1 / 0.01 | 100 / 99 |
| (13₂) $(C_2H_5O)_2$P(=O)–O–[5-methyl-benzo-1,2,4-triazine-1-N-oxide] | 0.1 | 100 |
| (18₁) $(C_2H_5O)_2$P(=O)–O–[7-methyl-benzo-1,2,4-triazine-1-N-oxide] | 0.1 | 100 |
| (10₂) $CH_3$–P(=S)(–OC_2H_5)–O–[5,7-dimethyl-benzo-1,2,4-triazine-1-N-oxide] | 0.1 | 95 |
| (19₁) $(C_2H_5O)_2$P(=O)–O–[7-methoxy-benzo-1,2,4-triazine-1-N-oxide] | 0.1 | 100 |

The following further examples are set forth to illustrate, without limitation, the process for producing the particular new compounds according to the present invention.

EXAMPLE 5

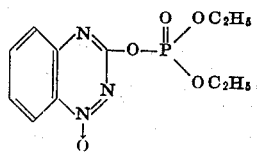

(17₂)

(a) 57 g (0.35 mol) 3-hydroxy-benzo-1,2,4-triazine-1-N-oxide are stirred for 30 minutes at 80° C together with 35 g triethylamine in 300 ml benzene. 60 g O,O-diethyl-phosphoric acid ester chloride are then added dropwise at 70° C to the reaction mixture, and the latter is stirred for a further 3 hours at 70° to 80° C, and then cooled. The mixture is washed once in each case with water, 2N hydrochloric acid and 2N solution of sodium hydroxide, and finally several times with water, in order to remove, the soluble constituents from the benzene solution. The solution is dried over sodium sulfate, and the solvent is distilled off. After recrystallization of the residue from benzene/ligroin, 61 g (62 percent of the theory) of 3-(O,O-diethyl-phosphoryloxy)-benzo-1,2,4-triazine-1-N-oxide of melting point 61° C are obtained. The compound is chromatographically pure.

Analysis:
Calculated for C₁₁H₁₄N₃O₅P (molecular weight 299):

|  | N | P |
|---|---|---|
| Found: | 14.04%; | 10.35%; |
|  | 13.66%; | 10.49%; |

(b) The 3-hydroxy-benzo-1,2,4-triazine-1-N-oxides required as starting materials can be obtained for example as follows:

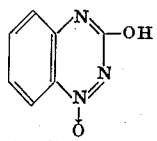

(IIa)

120 g (0.66 mol) o-nitro-phenyl-urea are boiled for 15 minutes in 10 percent solution of potassium hydroxide or sodium hydroxide, with stirring, until an oil separates which is re-dissolved by addition of a little water. The mixture is boiled for a further 10 minutes and concentrated hydrochloric acid is then cautiously added to it dropwise until a pH value of 2 to 3 is reached. The mixture is then cooled. The solid maize-yellow residue is filtered off with suction, dried in the air and recrystallized from water. The bulk of the O-nitro-aniline formed as byproduct can be eliminated by digestion with ether, ethyl acetate or other organic solvents. The crude yield is quantitative; after recrystallization from water, 64 g (69 percent of the theory) of 3-hydroxy-benzo-1,2,4-triazine-1-N-oxide are obtained in the form of light-yellow crystals of melting point 214° C (with decomposition).

Analysis:
Calculated for C₇H₅N₃O₂ (molecular weight 163):

|  | C | H | N |
|---|---|---|---|
|  | 51.53%; | 3.09%; | 25.76%; |
| Found | 51.09; | 3.57%; | 25.52%. |

In the same manner, the following starting substances can be obtained:

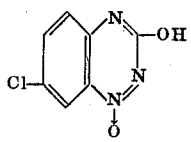

(IIb)

3-hydroxy-7-chloro-benzo-1,2,4-triazine-1-N-oxide;
Yield: 97 percent of the theory;
Melting point: 226° C.

Analysis:
Calculated for C₇H₄ClN₃O₂ (molecular weight 197.6):

|  | Cl | N |
|---|---|---|
|  | 17.85%; | 21.5%; |
| Found: | 18.1%; | 21.4%. |

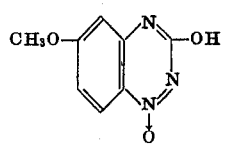

(IIc)

3-hydroxy-6-methoxy-benzo-1,2,4-triazine-1-N-oxide;
Yield: 54 percent of the theory
Melting point: 215° to 218° C.

Analysis:
Calculated for C₈H₇N₃O₃ (molecular weight 183):

|  | C | H | N |
|---|---|---|---|
|  | 49.75%; | 3.65%; | 21.76%; |
| Found: | 49.40%; | 3.32%; | 21.25%. |

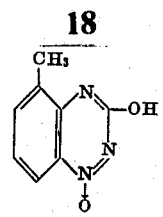

(IId)

3-hydroxy-5-methyl-benzo-1,2,4-triazine-1-N-oxide;
Yield: 93 percent of the theory;
Melting point: 230° C (with decomposition).

Analysis:
Calculated for C₈H₄N₃O₂ (molecular weight 177):

|  | N |
|---|---|
|  | 23.73% |
| Found: | 23.70%. |

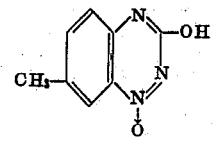

(IIe)

3-hydroxy-7-methyl-benzo-1,2,4-triazine-1-N-oxide
Yield: 99 percent of the theory;
Melting point: 202° C.

Analysis:
Calculated for C₈H₇N₃O₂ (molecular weight 177):

|  | N |
|---|---|
|  | 23.72%; |
| Found: | 23.69%; |

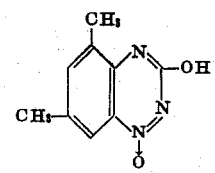

(IIf)

3-hydroxy-5,7-dimethyl-benzo-1,2,4-triazine-1-N-oxide;
Yield: 89 percent of the theory;
Melting point: 231° C (decomposition)

Analysis:
Calculated for C₉H₉N₃O₂ (molecular weight 191):

|  | C | H | N |
|---|---|---|---|
|  | 56.53%; | 4.74%; | 21.98%; |
| Found: | 56.4 %; | 4.76%; | 22.04%. |

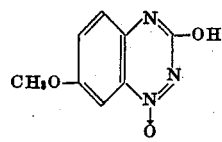

(IIg)

3-hydroxy-7-methoxy-benzo-1,2,4-triazine-1-N-oxide;
Yield: 91.5 percent of the theory;
Melting point: 219° C (decomposition);

Analysis:
calculated for C₈H₇N₃O₃ (molecular weight 183):

|  | C | H | N |
|---|---|---|---|
|  | 49.75%; | 3.65%; | 21.76%; |
| Found: | 49.77%; | 3.68%; | 21.57%. |

In the same manner as described in Example 5, the following compounds can also be prepared:

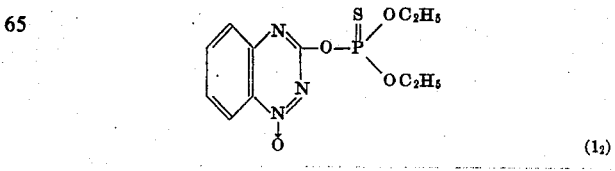

(I₂)

3-(O,O-diethyl-thionophosphoryloxy)-benzo-1,2,4-triazine-1-N-oxide;
  Yield: 32 percent of the theory:
  Melting point: 64° C Analysis:
Calculated for $C_{11}H_{14}N_3O_4PS$

| | N | P | S |
|---|---|---|---|
| (molecular weight 315): | 13.33%; | 9.82%; | 10.18%; |
| Found: | 13.97%; | 9.88%; | 10.13%. |

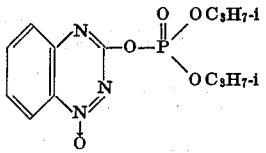

(12₂)

3-(o,o-diisopropyl-phosphoryloxy)-benzo-1,2,4-triazine-1-N-oxide;
  Yield: 19 percent of the theory;
  Melting point: 48° C Analysis:
Calculated for $C_{13}H_{18}N_3O_5P$

| | N | P |
|---|---|---|
| (molecular weight 327): | 12.84%; | 9.46%; |
| Found: | 12.32%; | 9.56%. |

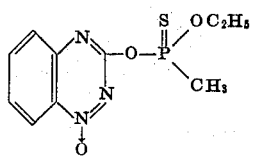

(2₃)

3-(methyl-O-ethyl-thionophosphonyloxy)-benzo-1,2,4-triazine-1-N-oxide;
  Yield: 63 percent of the theory;
  Melting point: 93° C Analysis:
Calculated for $C_{10}H_{12}N_3O_3PS$

| | N | P | S |
|---|---|---|---|
| (molecular weight 285): | 14.70%; | 10.86%; | 11.24%; |
| Found: | 14.66%; | 11.07%; | 11.23%. |

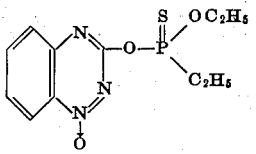

(3₂)

3-(ethyl-O-ethyl-thionophosphonyloxy)-benzo-1,2,4-triazine-1-N-oxide;
  Yield: 72 percent of the theory;
  Melting point: 86° C Analysis:
Calculated for $C_{11}H_{14}N_3O_3PS$

| | N | P | S |
|---|---|---|---|
| (molecular weight 299): | 14.04%; | 10.35%; | 10.71%; |
| Found: | 13.82%; | 10.59%; | 10.79%. |

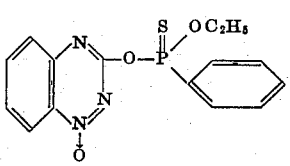

(20₁)

3-(phenyl-O-ethyl-thionophosphonyloxy)-benzo-1,2,4-triazine-1-N-oxide;
  Yield: 62 percent of the theory;
  Melting point: 73° C Analysis:
Calculated for $C_{15}H_{14}N_3O_3PS$

| | N | P | S |
|---|---|---|---|
| (molecular weight 347): | 12.10%; | 8.91%; | 9.23%; |
| Found: | 11.52%; | 9.12%; | 9.21%. |

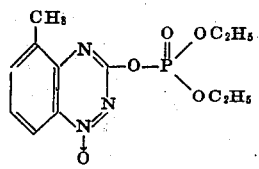

(13₁)

3-(O,O-diethyl-phosphoryloxy)-5-methyl-benzo-1,2,4-triazine-1-N-oxide;
  Yield: 43 percent of the theory;
  Melting point: 75° C Analysis:
Calculated for $C_{12}H_{16}N_3O_5$

| | N | P |
|---|---|---|
| (molecular weight 313): | 13.42%; | 9.89%; |
| Found: | 13.07%; | 9.98%. |

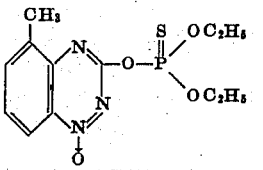

(15₂)

3-(O,O-diethyl-thionophosphoryloxy)-5-methyl-benzo-1,2,4-triazine-1-N-oxide;
  Yield: 31 percent of the theory;
  Melting point: 66° C Analysis:
Calculated for $C_{12}H_{16}N_3O_4PS$

| | N | P | S |
|---|---|---|---|
| (molecular weight 329): | 12.76%; | 9.40%; | 9.74%; |
| Found: | 12.49%; | 9.13%; | 9.73%. |

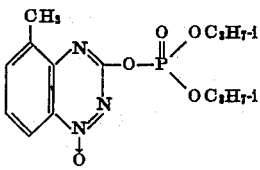

(4₁)

3-(O,O-diisopropyl-phosphoryloxy)-5-methyl-benzo-1,2,4-triazine-1-N-oxide;
  Yield: 57 percent of the theory;
  Melting point: 96° C Analysis:
Calculated for $C_{14}H_{20}N_3O_5P$

| | N | P |
|---|---|---|
| (molecular weight 341): | 12.31%; | 9.07%; |
| Found: | 12.03%; | 9.17%. |

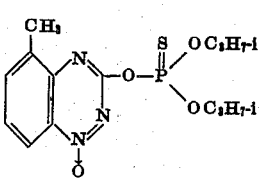

(21₁)

3-(O,O-diisopropyl-thionophosphoryl)-5-methyl-benzo-1,2,4-triazine-1-N-oxide;
  Yield: 57 percent of the theory;
  Melting point: 95° C Analysis:
Calculated for $C_{14}H_{20}N_3O_4PS$

| | N | P | S |
|---|---|---|---|
| (molecular weight 357): | 11.76%; | 8.66%; | 8.97%; |
| Found: | 11.91%; | 8.33%; | 9.03%. |

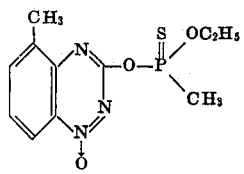

(9₂)

3-(methyl-O-ethyl-thionophosphonyloxy)-5-methyl-benzo-1,2,4-triazine-1-N-oxide;
Yield: 54 percent of the theory;
Melting point: 105° C.

| Analysis: | N | P | S |
|---|---|---|---|
| Calculated for C₁₁H₁₄N₃O₃PS (molecular weight 299): | 14.04%; | 10.35%; | 10.71%; |
| Found: | 13.89%; | 10.62%; | 10.57%. |

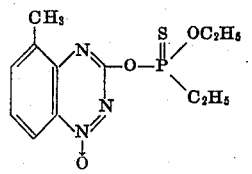

(14₂)

3-(ethyl-O-ethyl-thionophosphonyloxy)-5-methyl-benzo-1,2,4-triazine-1-N-oxide;
Yield: 57 percent of the theory;
Melting point: 97° C

| Analysis: | N | P | S |
|---|---|---|---|
| Calculated for C₁₂H₁₆N₃O₃PS (molecular weight 313): | 13.41%; | 9.89%; | 10.23%; |
| Found: | 13.27%; | 10.08%; | 10.27%. |

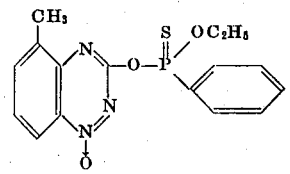

(22₁)

3-(phenyl-O-ethyl-thionophosphonyloxy)-5-methyl-benzo-1,2,4-triazine-1-N-oxide;
Yield: 73 percent of the theory;
Melting point: 72° C

| Analysis: | P | S |
|---|---|---|
| Calculated for C₁₆H₁₆N₃O₃PS (molecular weight 361): | 8.57%; | 8.87%; |
| Found: | 8.77%; | 8.80%. |

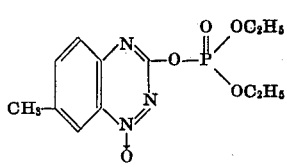

(18₂)

3-(O,O-diethyl-phosphoryloxy)-7-methyl-benzo-1,2,4-triazine-1-N-oxide;
Yield: 80 percent of the theory;
Melting point: 88°–90° C.

| Analysis: | P |
|---|---|
| Calculated for C₁₂H₁₆N₃O₅P (molecular weight 313): | 9.89%; |
| Found: | 9.76%. |

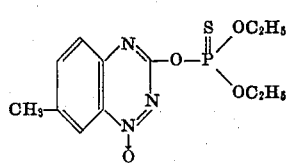

(23₁)

3-(O,O-diethyl-thionophosphoryloxy)7-methyl-benzo-1,2,4-triazine-1-N-oxide;
Yield: 46 percent of the theory;
Melting point: 170° C

| Analysis: | N | P | S |
|---|---|---|---|
| Calculated for C₁₂H₁₆N₃O₄PS (molecular weight 329): | 12.76%; | 9.40%; | 9.74%; |
| Found: | 12.84%; | 9.21%; | 9.66%. |

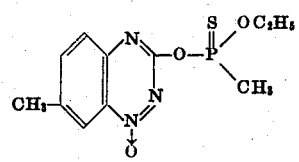

(6₂)

3-(methyl-O-ethyl-thionophosphonyloxy)7-methyl-benzo-1,2,4-triazine-1-N-oxide;
Yield: 50 percent of the theory;
Melting point: 95° C

| Analysis: | N | P | S |
|---|---|---|---|
| Calculated for C₁₁H₁₄N₃O₃PS (molecular weight 299): | 14.04%; | 10.35%; | 10.71%; |
| Found: | 13.75%; | 10.32%; | 10.77%. |

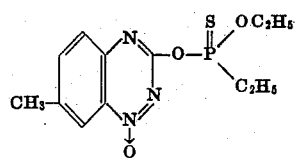

(24₂)

3-(ethyl-O-ethyl-thionophosphonyloxy)-7-methyl-benzo-1,2,4-triazine-1-N-oxide;
Yield: 70 percent of the theory;
Melting point: 92° C

| Analysis: | P | S |
|---|---|---|
| Calculated for C₁₂H₁₆N₃O₃PS (molecular weight 313): | 9.89%; | 10.23%; |
| Found: | 9.72%; | 9.89%. |

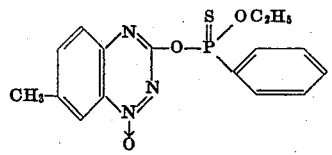

(25₁)

3-(phenyl-O-ethyl-thionophosphonyloxy)7-methyl-benzo-1,2,4-triazine-1-N-oxide;
Yield: 30 percent of the theory;
Melting point: 110°–113° C

| Analysis: | P | S |
|---|---|---|
| Calculated for C₁₆H₁₆N₃O₃PS (molecular weight 361): | 8.57%; | 8.87%; |
| Found: | 9.09%; | 9.08%. |

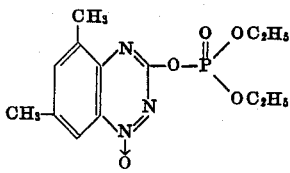

(26₁)

3-(O,O-diethyl-phosphoryloxy)-5,7-dimethyl-benzo-1,2,4-triazine-1-N-oxide;
Yield: 27 percent of the theory;

Melting point: 98° C

Analysis:
Calculated for C₁₃H₁₈N₃O₃P
(molecular weight 327): N 12.84%;
Found: 12.59%.

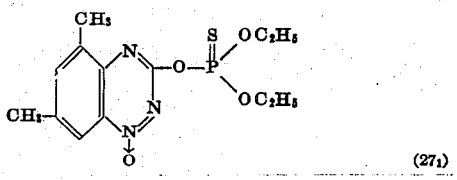

(27₁)

3-(O,O-diethyl-thionophosphoryloxy)-5,7-dimethyl-benzo-1,2,4-triazine-1-N-oxide;
Yield: 37 percent of the theory
Melting point: 124° C Analysis:
Calculated for C₁₃H₁₈N₃O₄PS
(molecular weight 343): N 12.24%; P 9.02%;
Found: 11.82%; 8.70%.

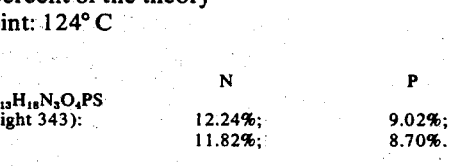

(28₁)

3-(O,O-diisopropyl-phosphoryloxy)-5,7-dimethyl-benzo-1,2,4-triazine-1-N-oxide;
Yield: 70 percent of the theory;
Melting point: 125° C Analysis:
Calculated for C₁₅H₂₂N₃O₅P
(molecular weight 355): N 11.83%; P 8.71%;
Found: 11.57%; 8.52%.

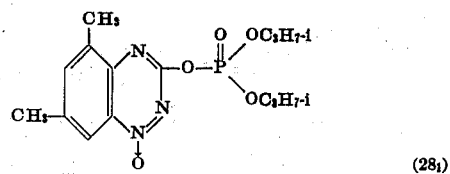

(29₁)

3-(O,O-diisopropyl-thionophosphoryloxy)-5,7-dimethyl-benzo-1,2,4-triazine-1-N-oxide;
Yield: 68 percent of the theory;
Melting point: 125° C

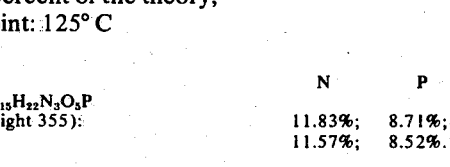

(10₂)

3-(methyl-O-ethyl-thionophosphonyloxy)-5,7-dimethyl-benzo-1,2,4-triazine-1-N-oxide;
Yield: 80 percent of the theory;
Melting point: 103° C Analysis:
Calculated for C₁₂H₁₆N₃O₃PS
(molecular weight 313): N 13.41%; P 9.89%; S 10.23%;
Found: 13.17% 9.86%; 10.20%.

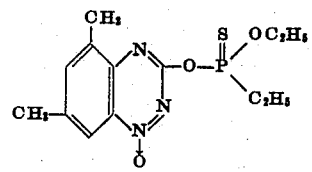

(11₂)

3-(ethyl-O-ethyl-thionophosphonyloxy)-5,7-dimethyl-benzo-1,2,4-triazine-1-N-oxide;
Yield: 61 percent of the theory;
Melting point: 115° C Analysis:
Calculated for C₁₃H₁₈N₃O₃PS
(molecular weight 327): N 12.84%; P 9.46%; S 9.80%;
Found: 13.10%; 9.11%; 9.88%.

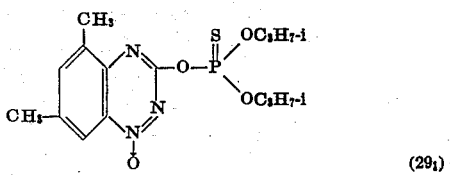

(30₁)

3-(phenyl-O-ethyl-thionophosphonyloxy)-5,7-dimethyl-benzo-1,2,4-triazine-1-N-oxide;
Yield: 67 percent of the theory;
Melting point: 120° C;

Analysis:
Calculated for C₁₇H₁₈N₃O₃PS
(molecular weight 375): N 11.20%; P 8.25%; S 8.45%;
Found: 11.41%; 8.19%; 8.52%.

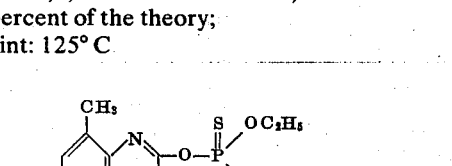

(19₂)

3-(O,O-diethyl-phosphoryloxy)-7-methoxy-benzo-1,2,4-triazine-1-N-oxide;
Yield: 76 percent of the theory;
Melting point: 82° C;

Analysis:
Calculated for C₁₂H₁₆N₃O₆P
(molecular weight 329): N 12.76%; P 9.40%;
Found: 12.71%; 9.09%.

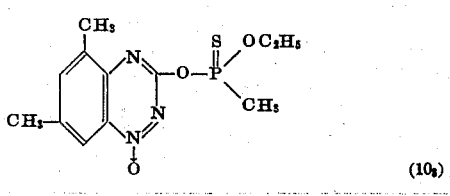

(6₂)

3-(O,O-diethyl-thionophosphoryloxy)-7-methoxy-benzo-1,2,4-triazine-1-N-oxide;
Yield: 24 percent of the theory;
Melting point: 78° C;

Analysis:
Calculated for C₁₂H₁₆N₃O₅PS
(molecular weight 345): N 12.17%; P 8.97%; S 9.28%;
Found: 12.00%; 8.34%; 9.01%.

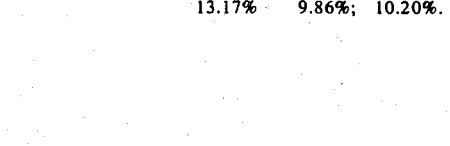

(16₂)

3-(O,O-diisopropyl-phosphoryloxy)-7-methoxy-benzo-1,2,4-triazine-1-N-oxide;
Yield: 80 percent of the theory;
Melting point: 65° C;

Analysis:      N      P
Calculated for $C_{14}H_{20}N_3O_6P$
(molecular weight 357):
Found:      11.76%;    8.66%;
     11.43%;    8.71%.

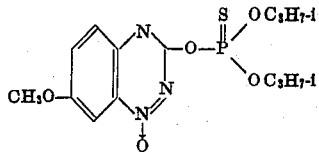

(31₁)

3-(O,O-diisopropyl-thionophosphoryloxy)-7-methoxy-benzo-1,2,4-triazine-1-N-oxide;
Yield: 12 percent of the theory;
Melting point: 82° C Analysis:      P      S
Calculated for $C_{14}H_{20}N_3O_5PS$
(molecular weight 373):
     8.29%;    8.59%;
Found:      8.32%;    8.31%.

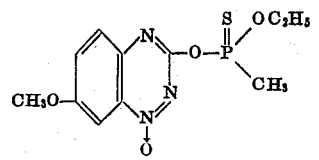

(7₂)

3-(methyl-O-ethyl-thionophosphonyloxy)-7-methoxy-benzo-1,2,4-triazine-1-N-oxide;
Yield: 76 percent of the theory;
Melting point: 99° C Analysis:      N      P
Calculated for $C_{11}H_{14}N_3O_4PS$
(molecular weight 315):
Found:      13.33%;    9.82%;
     13.46%;    9.27%.

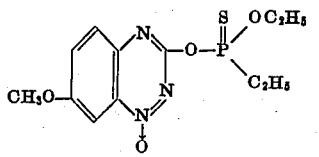

(8₂)

3-(ethyl-O-ethyl-thionophosphonyloxy)-7-methoxy-benzo-1,2,4-triazine-1-N-oxide;
Yield: 81 percent of the theory;
Melting point: 79° C Analysis:      N      P      S
Calculated for $C_{12}H_{16}N_3O_4PS$
(molecular weight 329):
Found:      12.76%;    9.40%;    9.74%;
     12.95%;    9.24%;    9.64%.

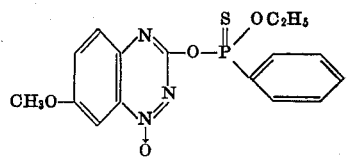

(32₁)

3-(phenyl-O-ethyl-thionophosphonyloxy)-7-methoxy-benzo-1,2,4-triazine-1-N-oxide;
Yield: 75 percent of the theory;
Melting point: 120° C Analysis:      N      P
Calculated for $C_{16}H_{16}N_3O_4PS$
(molecular weight 377):
Found:      11.14%;    8.20%;
     10.85%;    7.84%.

It will be realized that all of the foregoing compounds contemplated by the present invention possess the desired selective pesticidal, especially arthropodicidal, i.e., insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Phosphorus acid ester of 3-hydroxy-benzo-1,2,4-triazine-1-N-oxide of the formula

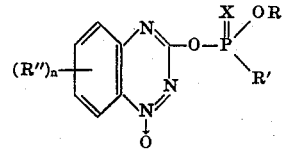

in which R is alkyl of one to four carbon atoms, R' is selected from the group consisting of alkyl of one to four carbon atoms, alkoxy of one to four carbon atoms and phenyl, R" is selected from the group consisting of alkyl of one to four carbon atoms and alkoxy of one to four carbon atoms, X is selected from the group consisting of oxygen and sulfur, and n is a whole number from 0 to 2.

2. Compound according to claim 1 wherein R is $C_{1-3}$ alkyl, R' is selected from the group consisting of $C_{1-3}$ alkyl, $C_{1-3}$ alkoxy and phenyl, R" is selected from the group consisting of $C_{1-2}$ alkyl and $C_{1-2}$ alkoxy, X is selected from the group consisting of oxygen and sulfur, and n is 0–2.

3. Compound according to claim 1 wherein R is $C_{1-3}$ alkyl, R' is selected from the group consisting of $C_{1-3}$ alkyl, $C_{1-3}$ alkoxy and phenyl, R" is selected from the group consisting of methyl and methoxy, X is selected from the group consisting of oxygen and sulfur, and n is 0–2.

4. Compound according to claim 1 wherein such compound is 3-(O,O-diethyl-thionophosphoryloxy)-benzo-1,2,4-triazine-1-N-oxide of the formula

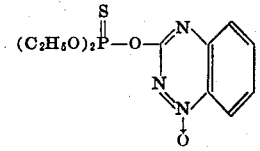

5. Compound according to claim 1 wherein such compound is 3-(methyl-O-ethyl-thionophosphonyloxy)-benzo-1,2,4-triazine-1-N-oxide of the formula

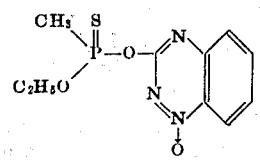

6. Compound according to claim 1 wherein such compound is 3-(O,O-diisopropyl-phosphoryloxy)-5-methyl-benzo-1,2,4-triazine-1-N-oxide of the formula

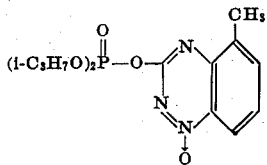

7. Compound according to claim 1 wherein such compound is 3-(methyl-O-ethyl-thionophosphonyloxy)-7-methyl-benzo-1,2,4-triazine-1-N-oxide of the formula

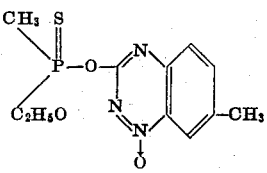

8. Compound according to claim 1 wherein such compound is 3-(O,O-diethyl-thionophosphoryloxy)-7-methoxy-benzo-1,2,4-triazine-1-N-oxide of the formula

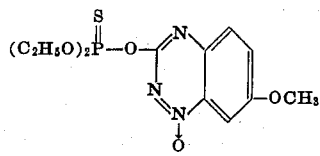

9. Compound according to claim 1 wherein such compound is 3-(methyl-O-ethyl-thionophosphonyloxy)-5,7-dimethyl-benzo-1,2,4-triazine-1-N-oxide of the formula

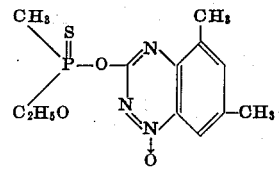

10. Compound according to claim 1 wherein such compound is 3-(O,O-diisopropyl-phosphoryloxy)-benzo-1,2,4-triazine-1-N-oxide of the formula

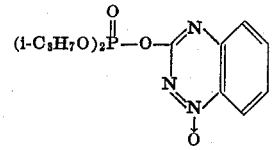

* * * * *

UNITED STATES PATENT OFFICE
CERTIFICATE OF CORRECTION

Patent No. 3,697,518     Dated October 10, 1972

Inventor(s) Karl-Julius Schmidt et al

It is certified that error appears in the above-identified patent and that said Letters Patent are hereby corrected as shown below:

Column 2, lines 25-26, in the formula - change $\begin{smallmatrix} X \\ | \\ P- \end{smallmatrix}$ to $\begin{smallmatrix} X \\ || \\ P- \end{smallmatrix}$ Column 3, line 19, change "R' " to --R"--.
Column 4, line 57, change "acaroma" to -- Acarina --.
Column 5, line 16, change "( ) Chrysorrhoea)" to --(Euproctis Chrysorrhoea)--.

Column 15, Example 2₂ in the formula, change

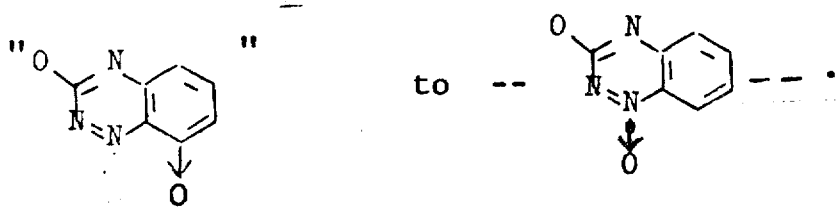

Column 18, line 27, change "23.72%" to --23.73%--.
Column 19, line 16, change " (o,o-" to -- 0,0- --.
Column 22, line 53, cancel "S" and insert after column "P"

S
-- 8.87% --.
   9.08%

Signed and sealed this 3rd day of April 1973.

(SEAL)
Attest:

EDWARD M. FLETCHER, JR.
Attesting Officer

ROBERT GOTTSCHALK
Commissioner of Patents